United States Patent
Zhu (10) Patent No.: US 11,684,152 B2
(45) Date of Patent: Jun. 27, 2023

(54) RAPIDLY ASSEMBLED TABLETOP SUPPORT

(71) Applicant: Changzhou Kaidi Electrical Co., Ltd., Changzhou (CN)

(72) Inventor: Gengxing Zhu, Changzhou (CN)

(73) Assignee: CHANGZHOU KAIDI ELECTRICAL CO., LTD., Changzhou (CN)

( * ) Notice: Subject to any disclaimer, the term of this patent is extended or adjusted under 35 U.S.C. 154(b) by 166 days.

(21) Appl. No.: 17/292,559

(22) PCT Filed: Dec. 5, 2020

(86) PCT No.: PCT/CN2020/134111
§ 371 (c)(1),
(2) Date: May 10, 2021

(87) PCT Pub. No.: WO2021/212855
PCT Pub. Date: Oct. 28, 2021

(65) Prior Publication Data
US 2022/0304463 A1 Sep. 29, 2022

(30) Foreign Application Priority Data
Apr. 23, 2020 (CN) .......................... 202010325411.3

(51) Int. Cl.
*A47B 13/00* (2006.01)
*A47B 9/00* (2006.01)
(52) U.S. Cl.
CPC .............. *A47B 13/003* (2013.01); *A47B 9/00* (2013.01)

(58) Field of Classification Search
CPC ............ A47B 13/003; A47B 9/00; A47B 3/06
USPC ................. 108/153.1, 157.1, 158.12, 158.13
See application file for complete search history.

(56) References Cited

U.S. PATENT DOCUMENTS

| | | | | |
|---|---|---|---|---|
| 4,944,235 A * | 7/1990 | Jahnke | ................. | A47B 13/003 108/154 |
| 5,289,784 A * | 3/1994 | Waibel | ................... | A47B 13/02 248/371 |
| 11,096,481 B2 * | 8/2021 | Patton | .................. | A47B 13/023 |
| 11,382,414 B1 * | 7/2022 | Zhang | .................. | A47B 3/0818 |
| 11,490,726 B1 * | 11/2022 | Zhang | ...................... | A47B 3/08 |
| 2015/0282605 A1 * | 10/2015 | Wu | ........................... | A47B 9/00 248/188.2 |
| 2017/0224101 A1 * | 8/2017 | Bruder | ................... | A47B 13/06 |

(Continued)

FOREIGN PATENT DOCUMENTS

WO WO-2015180723 A1 * 12/2015 ............. A47B 13/02
WO WO-2019174686 A2 * 9/2019 ............. A47B 13/06

*Primary Examiner* — Jose V Chen
(74) *Attorney, Agent, or Firm* — WPAT, P.C (57) ABSTRACT

A rapidly assembled tabletop support includes cross members and a stringer perpendicular to the cross members. There are locking mechanisms on the cross member, and steps and necks corresponding to the steps on the stringer. By pushing the stringer to move relative to the cross member, the stringer and its steps are closely matched with a tube wall of the cross member, and the locking mechanism is engaged into the neck on the stringer, realizing rapid engagement between the cross member and the stringer. The rapidly assembled tabletop support has advantages such as high production efficiency, simple structure, convenient installation, reliable use, and adjustable length.

8 Claims, 6 Drawing Sheets

(56) References Cited

U.S. PATENT DOCUMENTS

| | | | |
|---|---|---|---|
| 2018/0020822 A1* | 1/2018 | Miller | A47B 13/088 |
| | | | 108/69 |
| 2018/0103753 A1* | 4/2018 | Davidsen | A47B 13/003 |
| 2018/0110325 A1* | 4/2018 | Oberndörfer | A47B 13/003 |
| 2018/0242728 A1* | 8/2018 | Hansen | A47B 3/0818 |
| 2019/0082823 A1* | 3/2019 | Applegate | A47B 1/08 |
| 2019/0125072 A1* | 5/2019 | Tseng | A47B 9/20 |
| 2020/0154876 A1* | 5/2020 | Liu | A47B 9/00 |
| 2020/0154880 A1* | 5/2020 | Anderson | A47B 21/02 |
| 2020/0154881 A1* | 5/2020 | Applegate | A47B 3/0815 |
| 2020/0359785 A1* | 11/2020 | Lu | A47B 9/00 |
| 2021/0015250 A1* | 1/2021 | Chu | A47B 17/02 |
| 2021/0030146 A1* | 2/2021 | Riebner | A47B 9/00 |
| 2021/0100355 A1* | 4/2021 | Jørgensen | A47B 3/0809 |
| 2021/0100356 A1* | 4/2021 | Huang | A47B 17/03 |
| 2022/0257003 A1* | 8/2022 | Ergun | A47B 9/20 |

* cited by examiner

RAPIDLY ASSEMBLED TABLETOP SUPPORT

CROSS REFERENCE TO RELATED APPLICATION

This application claims the priority of Chinese Patent Application No. 202010325411.3, entitled "Rapidly Assembled Tabletop Support", filed on Apr. 23, 2020, the disclosure of which is incorporated herein by reference in its entirety.

BACKGROUND OF THE INVENTION

1. Field of the Invention

The present invention belongs to the technical field of intelligent lifting tables, specifically relating to a rapidly assembled tabletop support.

2. Description of Related Art

Figure 1:
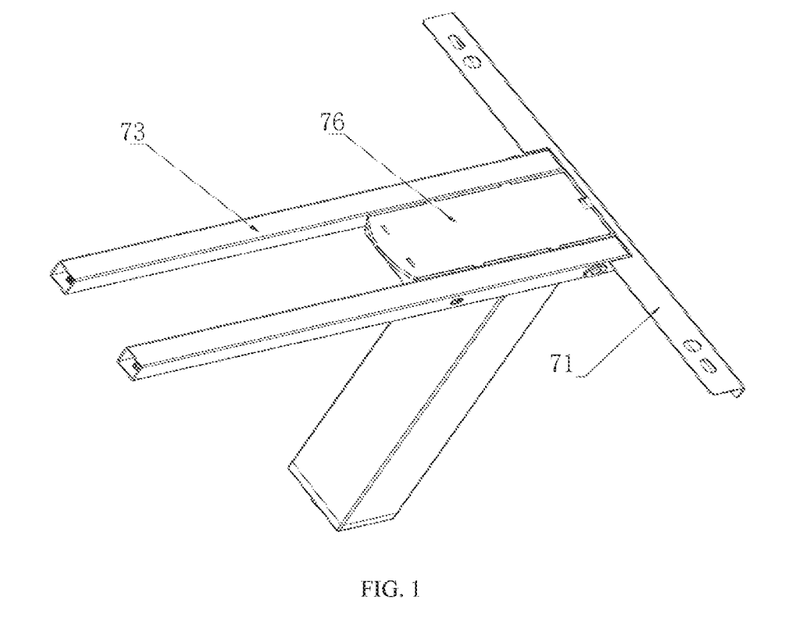
FIG. 1 is a structural diagram of the assembly structure of the existing tabletop support.
Figure 2:
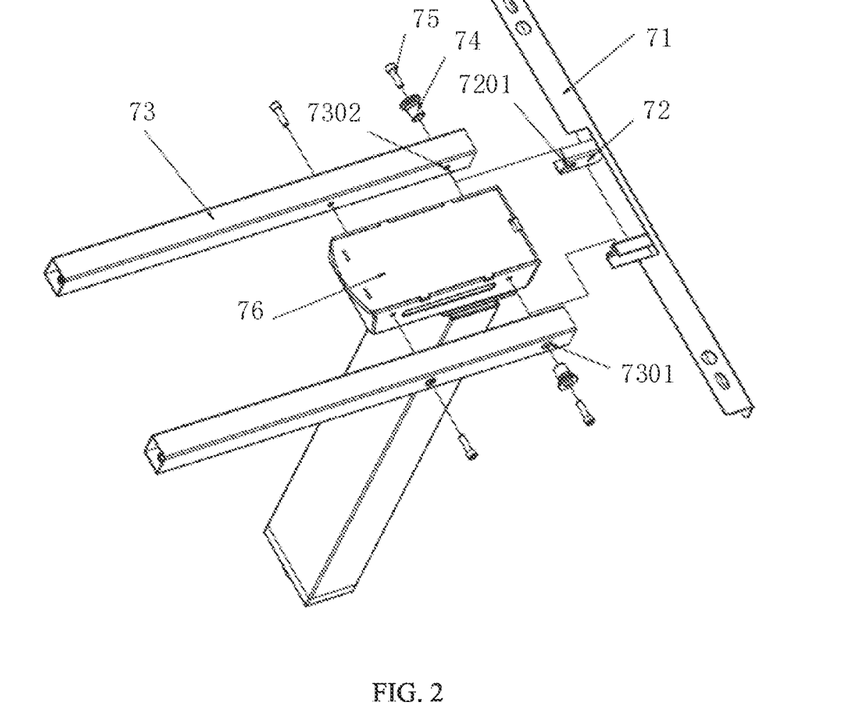
FIG. 2 is a structural diagram for a decomposition structure of FIG. 1.
Figure 3:
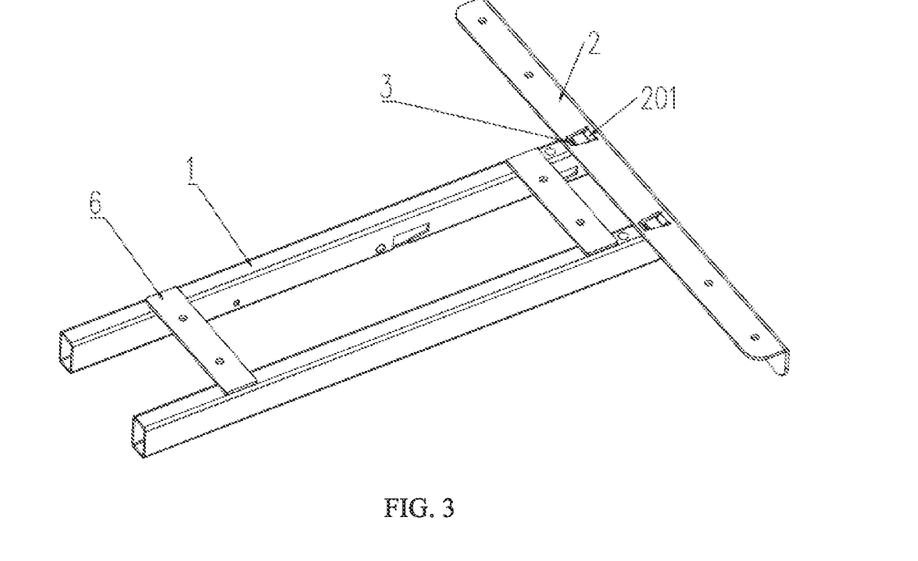
FIG. 3 is a structural diagram I according to Embodiment 1 of the present invention.
Figure 4:
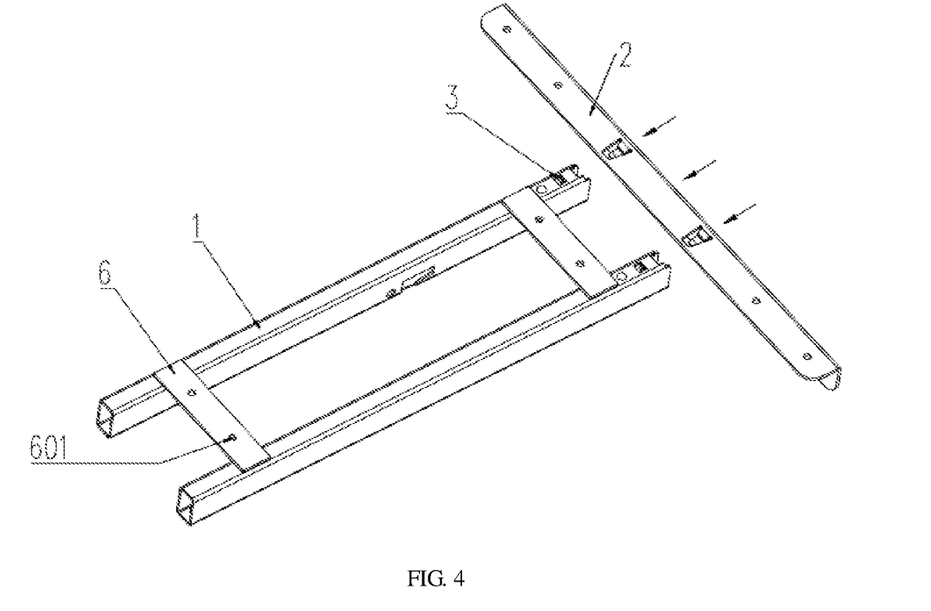
FIG. 4 is a structural diagram II according to Embodiment 1 of the present invention.
Figure 5:
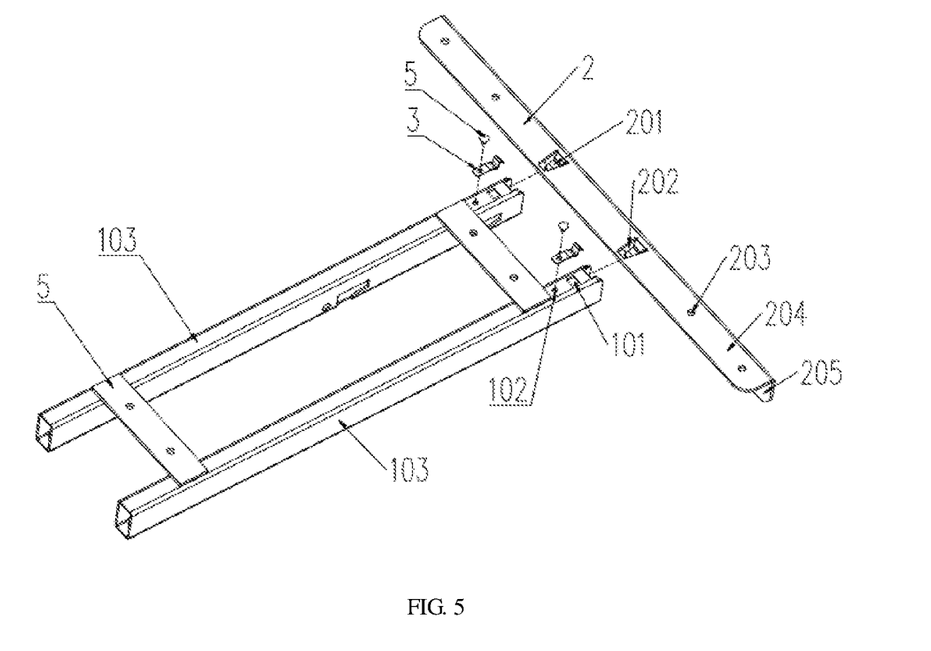
FIG. 5 is a structural diagram III according to Embodiment 1 of the present invention.
Figure 6:
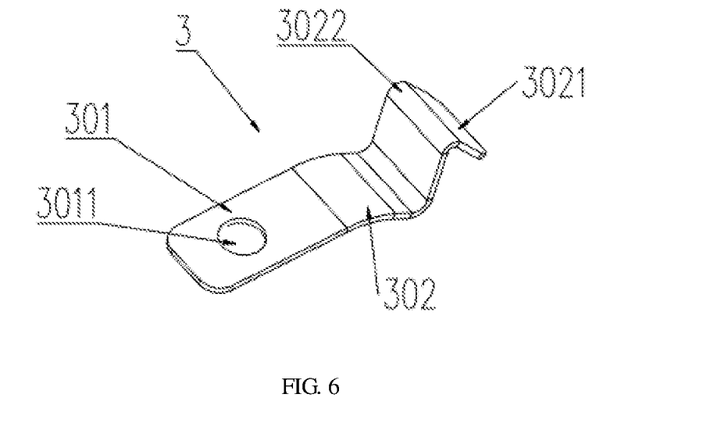
FIG. 6 is a structural diagram of the locking mechanism.
Figure 7:
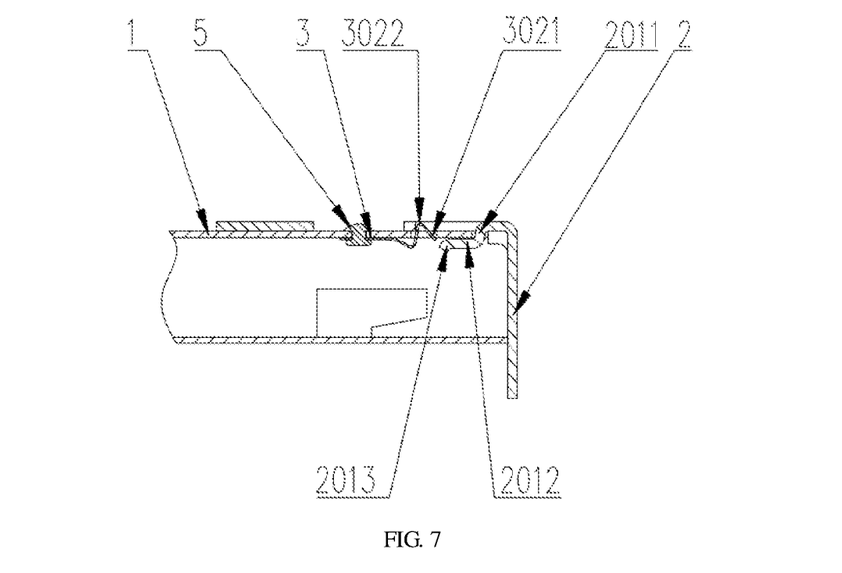
FIG. 7 is a structural diagram of the assembly structure of the cross member and the stringer.

As we all know, tables play a very important role in daily life, and people need them all the time. However, the installation methods of existing tabletop supports in the market are generally cumbersome, as shown in FIG. 1 and FIG. 2. The stringer assembly 71 has a slot 72 which is provided with a mounting hole 7201. The cross member 73 is provided with a through-hole 7301 and a threaded hole 7302 which correspond to the mounting hole 7201. The cross member 73 is installed outside the slot 72, and the rubber bushing 74 is inserted into the through-hole 7301 and the slot 72 in turn to fix the through-hole 7301 and the slot 72. The hexagon socket head cap screw 75 is then inserted into the rubber bushing 74 to be assembled with the threaded hole 7302.

The above-mentioned tabletop support is installed by using the hexagon socket head cap screw 75 to lock and press the slot 72 in the stringer assembly 71. However, the slot 72 needs to be welded on the stringer assembly 71, which increases the fabricating cost and reduces the production efficiency. At the same time, the screw needs to be locked when assembling, showing low assembly efficiency.

SUMMARY OF THE INVENTION

The technical matter to be solved by the present invention is that in order to overcome the defects in the prior art, the invention provides a rapidly assembled tabletop support characterized by high production efficiency, simple structure, convenient installation, and reliable use.

The present invention adopts the following technical solution for the technical matter: a rapidly assembled tabletop support, comprising cross members and a stringer perpendicular to the cross members. There are locking mechanisms on the cross member and steps and necks corresponding to the steps on the stringer. By pushing the stringer to move relative to the cross member, the stringer and its steps are closely matched with the tube wall of the cross member, and the locking mechanism is engaged into the neck on the stringer, realizing rapid engagement between the cross member and the stringer.

Further, in the above technical solution, the locking mechanism, the spring piece, is of a separated structure with the cross member and is fixed on the cross member by using fixed members or by welding.

Further, in the above technical solution, the locking mechanism is integrated with the cross member and is the part of the cross member.

Further, in the above technical solution, there are two cross members which are arranged along the length direction of the tabletop support and symmetrically distributed left and right, and there are connecting rods inside the two cross members which are respectively fixed with the corresponding ends of the connecting rods after the distance between the two cross members is determined, realizing the adjustable length of the tabletop support.

Further, in the technical solution, the step comprises the kick section, tread section, and guide section which are connected end to end, and the step is closely matched with the tube wall of the cross member under the guidance of the guide section.

Further, in the technical solution, the locking mechanism comprises the connecting section and folding section and is connected to the cross members through the connecting section; the folding section is provided with an ejection part which comprises the peak part and the guide part which are connected end to end and is ejected from the first through-hole under the guidance of the guide part.

Further, in the technical solution, the cross member is provided with the second through-hole, and the connecting section is provided with the third through-hole; the cross member and the locking mechanism can be installed and fixed by inserting the blind rivet into the second through-hole and the third through-hole in sequence.

Further, in the technical solution, the space area formed by the front side and the rear side of the step is gradually contracted, with wide outside and narrow inside.

Further, in the technical solution, each cross member has two square tubes symmetrically distributed back and forth which are fixed and connected through longitudinal connecting plates, and the two square tubes and the longitudinal connecting plates are assembled to form one cross member.

Further, in the technical solution, there are two cross members which are arranged along the length direction of the tabletop support and symmetrically distributed left and right, and each cross member is the C-shaped fixed plate which is directly engaged with the stringer through the supporting locking mechanism and neck.

The beneficial effects of the present invention are as follows: The present invention is a rapidly assembled tabletop support. It is suitable for dining tables, desks, office tables, conference tables, student desks, or coffee tables and has the following advantages:

The step is an integral part of the stringer, so the welding process is omitted in production, contributing to high production efficiency and simple structure;

The step is closely matched with the tube wall of the cross member, and the lock mechanism fixed on the cross member in advance can be engaged with the neck of the stringer, thus effectively preventing the stringer from falling off. No locking screw is needed during the assembly, contributing to convenient installation and reliable use;

In addition, the two cross members can freely adjust the spacing in a large range to realize the length adjustment of the tabletop support with the aid of the connecting rods.

BRIEF DESCRIPTION OF THE DRAWINGS

To illustrate technical solutions in embodiments of the present invention or the prior art more clearly, drawings to be used for describing the embodiments or prior art are introduced briefly in the following. Apparently, the drawings in the following description are only some embodiments recorded in the application, and persons of ordinary skill in the art can derive other drawings from these accompanying drawings without creative efforts.

DETAILED DESCRIPTION OF THE PREFERRED EMBODIMENTS

To illustrate purposes, technical solutions, and advantages in embodiments of the present invention, technical solutions of embodiments of the present invention are hereinafter described clearly and completely with reference to accompanying drawings in the embodiments of the present invention. Evidently, the described embodiments are only part rather than all of the embodiments of the present invention. Other embodiments based on the present invention as acquired by general technicians in the field without making any creative effort also belong to the protection scope of the invention.

In the following text, the terms such as "inner", "top", "bottom" to indicate the orientation or positional relationship describe the orientation or positional relationship based on the drawings. They are only for the convenience of describing the embodiments and simplifying the description, but does not indicate or imply that the referred device or element must have a specific orientation, be constructed and operated in a specific orientation, so they cannot be understood as a limitation to the present invention.

Embodiment 1

See FIG. 3-FIG. 7 for a rapidly assembled tabletop support of the present invention. With suitable tabletop plates, it forms dining tables, desks, office tables, conference tables, student desks, or coffee tables and comprises the cross member 1 and the stringer 2 perpendicular to the cross member 1.

The locking mechanism 3 is fixed on the cross member 1 and is the spring piece. The cross member 1 is provided with the first through-hole 101 for the locking mechanism 3 to eject. The locking mechanism 3 is made of spring steel and composed of the connecting section 301 and the folding section 302. The connecting section 301 and the folding section 302 are of an integrated structure. The locking mechanism 3 is connected to the cross member 1 through the connecting section 301. The folding section 302 has the ejection part which includes the peak part 3022 and the guide part 3021 connected end to end and is ejected from the first through-hole 101 under the guidance of the guide part 3021. The peak part 3022 is higher than the guide part 3021 which is higher than the connecting section 301.

It should be noted that the locking mechanism 3 is fixed to the cross member 1 in advance, and the locking mechanism 3 is of a separated structure with the cross member 1. The locking mechanism 3 is fixed to the cross member 1 by a fixed member or by welding, that is, it can be fixed by welding, riveting, or other convenient fixing methods. Specifically, before a user receives the tabletop support, the manufacturer has already fixed the locking mechanism 3 on the cross member 1 in advance. The user does not need to consider how to install the locking mechanism 3 during installation and only needs to push the stringer 2 in the direction of the cross member 1 to complete the installation of the tabletop support. Therefore, the installation is fast and convenient. In addition, to provide convenience for subsequent disassembly, the locking mechanism 3 does not need to be disassembled during disassembly. The stringer 2 is the only element to be disassembled from the cross member 1.

There are steps 201 and necks 202 which correspond to the steps 201 on the stringer 2. Specifically, the step 201 and the neck 202 are integral parts of the stringer 2. The step 201 is fixed on the stringer 2 and located below the neck 202, i.e., the stringer 2 is pressed to form the step 201. On the premise of ensuring the reliability of the product and meeting requirements of the rapid installation, the stringer 2 is free of welding and only needs to be pressed, thus improving the production and assembly efficiency.

The step 201 comprises the kick section 2011, tread section 2012, and guide section 2013 which are connected end to end, and the step 201 is closely matched with the tube wall of the cross member 1 under the guidance of the guide section 2013. The kick section 2011 and the tread section 2012 are connected through an arc, and the tread section 2012 and the guide section 2013 are also connected through an arc. The guide section 2013 is arranged obliquely downward, and the included angle formed between the guide section 2013 and the tread section 2012 is an obtuse angle and ranges from 90° to 180°.

By pushing the stringer 2 to move relative to the cross member 1, the stringer 2 and its steps 201 are closely matched with the tube wall of the cross member 1, and the locking mechanism 3 ejected from the first through-hole 101 is engaged into the neck 202 on the stringer 2 to realize rapid engagement between the cross member 1 and the stringer 2 and prevent the stringer 2 from falling off, contributing to simple and reliable assembly.

The cross member 1 is made of iron or steel and has two square tubes 103 which are symmetrically distributed back and forth. The two square tubes 103 and the stringer 2 are directly engaged through the supporting locking mechanism 3 and the neck 202. The locking mechanism 3 is fixed at the upper wall inside each square tube 103, and the stringer 2 is provided with two necks 202. The first through-hole 101 is arranged at the top of the square tube 103 and is a rectangular hole or of any other shapes suitable for the locking mechanism 3 to eject.

The two square tubes 103 are fixed and connected through longitudinal connecting plates 6 which are perpendicular to the cross member 1. There are two longitudinal connecting plates 6 which are arranged in parallel and fixed on the upper surfaces of the two cross members 1, and the two square tubes 103 and the two longitudinal connecting plates 6 are assembled to form one cross member 1. The longitudinal connecting plate 6 is provided with the fifth through-hole 601 for installing and fixing the longitudinal connecting plate 6 to the tabletop plate by screws.

The top of each square tube 103 is provided with the second through-hole 102 which is located inside the first through-hole 101. The connecting section 301 is provided with the third through-hole 3011. The square tube 103 and the locking mechanism 3 can be installed and fixed by inserting the blind rivet 5 into the second through-hole 102 and the third through-hole 3011 in sequence.

It should be noted that the blind rivet 5 includes a rivet body and a rivet stem. The blind rivet is used for single-sided riveting and must be riveted with a special tool, i.e. riveters (manual, electric, and pneumatic). During riveting, the rivet stem is pulled by a special riveter to expand the rivet body for riveting. The blind rivet 5 can be of the open button head and countersunk head, or of the enclosed type.

The stringer 2 is made of iron or steel and is of a 7-shaped profile structure. The step 201 and the neck 202 are both pressed and formed on the transversely folding edge 204 of the stringer 2. The outer end surface of the cross member 1 is opposite to the vertical folding edge 205 of the stringer 2. In addition, the transversely folding edge 204 is provided with the fourth through-hole 203 for installing and fixing the stringer 2 to the tabletop plate by screws.

The space area formed by the front side and the rear side of the step 201 is gradually contracted with wide outside and narrow inside, which facilitates the installation of the locking mechanism 3 and the neck 202.

Embodiment 2

Figure 8:
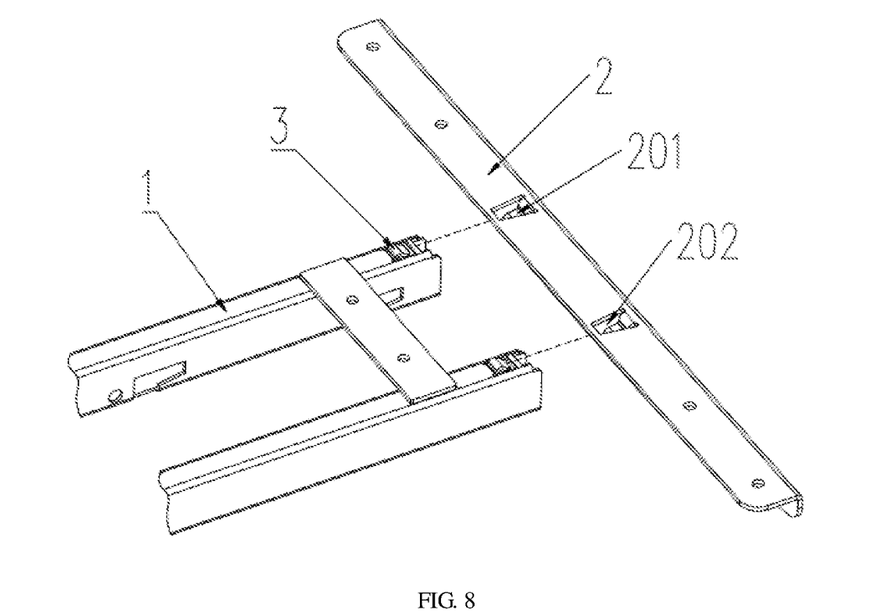
FIG. 8 is a structural diagram according to Embodiment 2 of the present invention.

See FIG. 8. Compared with Embodiment 1, Embodiment 2 has the following differences: The locking mechanism 3 is integrated with the cross member 1 and is a part of the cross member 1, and specifically, the locking mechanism 3 is formed by the pressing of the cross member 1.

Embodiment 3

Figure 9:
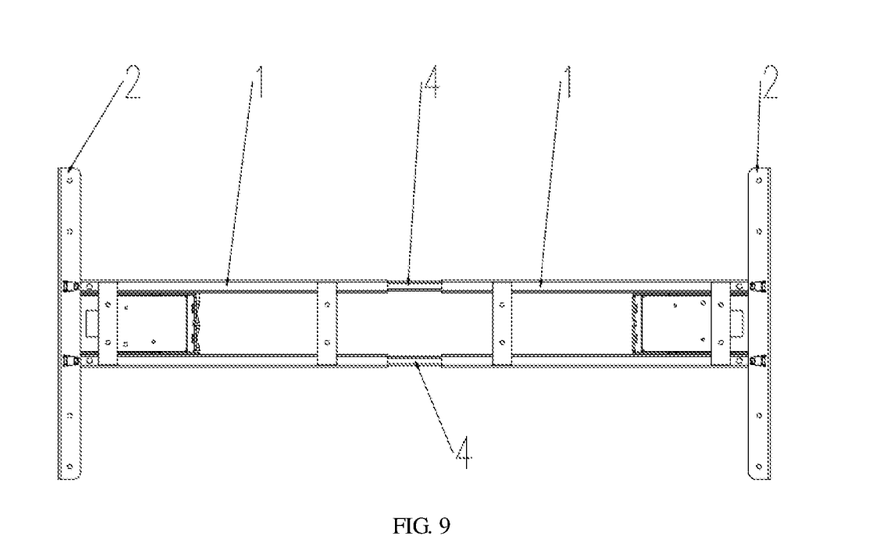
FIG. 9 is a structural diagram according to Embodiment 3 of the present invention.
Figure 10:
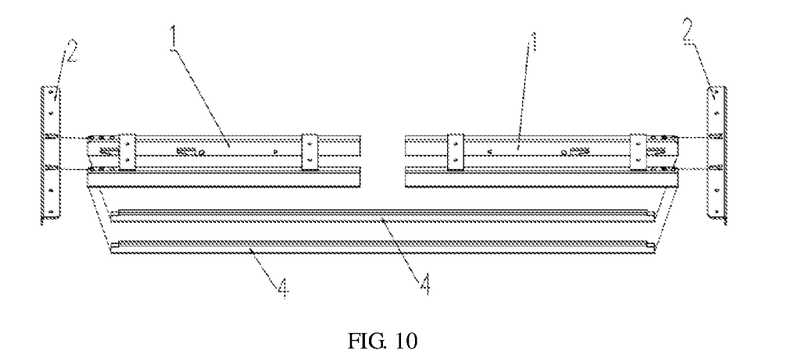
FIG. 10 is a structural diagram for a decomposition structure of FIG. 9.

See FIG. 9-FIG. 10. Compared with Embodiment 1, Embodiment 3 has the following differences: there are two cross members 1 which are arranged along the length direction of the tabletop support and symmetrically distributed left and right, and there are two connecting rods 4 inside the two cross members 1 which are respectively fixed with the corresponding ends of the connecting rods 4 after the distance between the two cross members 1 is determined, realizing the adjustable length of the tabletop support.

Embodiment 4

Figure 11:
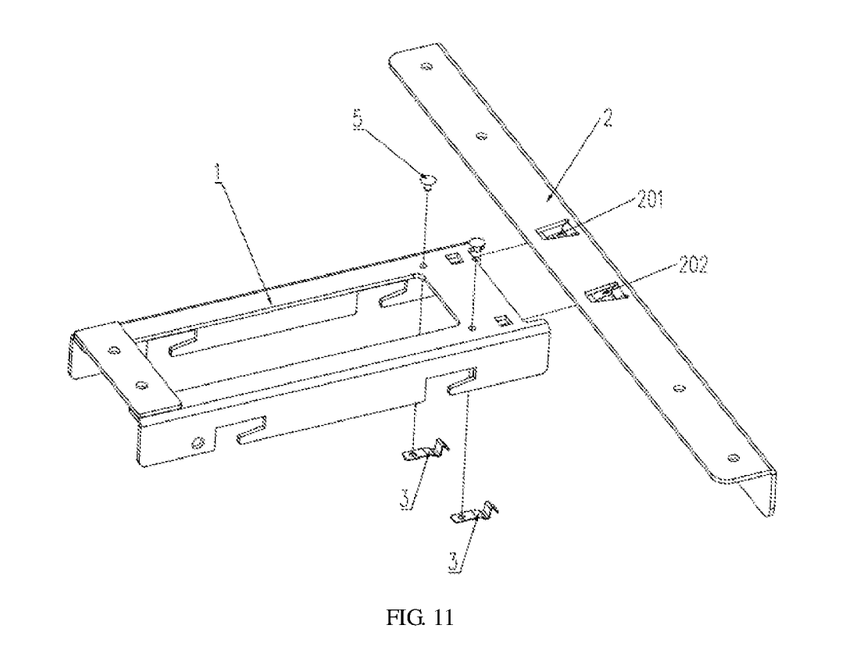
FIG. 11 is a structural diagram according to Embodiment 4 of the present invention.

See FIG. 11. Compared with Embodiment 1, Embodiment 4 has the following differences: There are two cross members 1 which are arranged along the length direction of the tabletop support and symmetrically distributed left and right, and each cross member 1 is the C-shaped fixed plate which is used to replace the two square tubes 103 and two longitudinal connecting plates 6. The C-shaped fixed plate is directly engaged with the stringer 2 through the supporting locking mechanism 3 and neck 202. The C-shaped fixed plate is provided with two locking mechanisms 3, and the stringer 2 is provided with two necks 202.

The foregoing description is just the detailed description of the preferred embodiments to which, however, the protection scope in the invention is not limited. Alternatives or variations made in accordance with technical solutions and concepts of the present invention by any technicians familiar with the field of the invention within the technical scope disclosed in the present invention shall be also covered by the protection scope of the present invention.

What is claimed is:

1. A rapidly assembled tabletop support, comprising cross members and a stringer perpendicular to the cross members, wherein locking mechanisms are fixed on the cross member; the stringer is provided with steps and necks corresponding to the steps; by pushing the stringer to move relative to the cross members, the stringer and its steps are closely matched with a tube wall of the cross member, and the locking mechanism is engaged into the neck on the stringer, realizing rapid engagement between the cross members and the stringer; and wherein the step comprises a kick section, a tread section, and a guide section which are connected end to end, and the kick section of the step is closely matched with the tube wall of the cross member under a guidance of the guide section.

2. The rapidly assembled tabletop support according to claim 1, wherein the locking mechanism comprises a spring piece, and the locking mechanism is fixed on the cross member by using fixed members or by welding.

3. The rapidly assembled tabletop support according to claim 2, wherein each locking mechanism comprises a connecting section and a folding section, and the folding section is connected to the cross member through the connecting section; the folding section is provided with an ejection part which comprises a peak part and a guide part which are connected end to end, and the peak part is ejected from a first through-hole under a guidance of the guide part.

4. The rapidly assembled tabletop support according to claim 2, wherein the cross member is provided with second through-holes, and a connecting section is provided with third through-holes; the cross member and the locking mechanism are installed and fixed by inserting a blind rivet into the second through-hole and the third through-hole in sequence.

5. The rapidly assembled tabletop support according to claim 1, wherein the locking mechanism is integrated with the cross member and is the part of the cross member.

6. The rapidly assembled tabletop support according to claim 1, wherein there are two cross members which are arranged along the length direction of the tabletop support and symmetrically distributed left and right, and there are connecting rods inside the two cross members which are respectively fixed with the corresponding ends of the connecting rods after the distance between the two cross members is determined, realizing an adjustable length of the tabletop support.

7. The rapidly assembled tabletop support according to claim 6, wherein each cross member has two square tubes symmetrically distributed back and forth which are fixed and connected through longitudinal connecting plates, and the two square tubes and the longitudinal connecting plates are assembled to form one cross member.

8. A rapidly assembled tabletop support, comprising cross members and a stringer perpendicular to the cross members, wherein locking mechanisms are fixed on the cross member; the stringer is provided with steps and necks corresponding to the steps; by pushing the stringer to move relative to the cross members, the stringer and its steps are closely matched with a tube wall of the cross member, and the locking mechanism is engaged into the neck on the stringer, realizing rapid engagement between the cross members and the stringer; and wherein each locking mechanism comprises a connecting section and a folding section, the folding section is connected to the cross member through the connecting section; the folding section is provided with an ejection part comprising a peak part and a guide part which are connected end to end, and the peak part is ejected from a first through-hole under a guidance of the guide part.

\* \* \* \* \*